(12) United States Patent
Adcock (10) Patent No.: US 10,682,812 B2
(45) Date of Patent: Jun. 16, 2020

(54) POWDER SPREADER AND ADDITIVE MANUFACTURING APPARATUS THEREOF

(71) Applicant: GENERAL ELECTRIC COMPANY, Schenectady, NY (US)

(72) Inventor: Thomas Charles Adcock, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/866,525

(22) Filed: Jan. 10, 2018

(65) Prior Publication Data
US 2019/0210281 A1 Jul. 11, 2019

(51) Int. Cl.
| | |
|---|---|
| *B29C 64/214* | (2017.01) |
| *B22F 3/105* | (2006.01) |
| *B28B 1/00* | (2006.01) |
| *B33Y 30/00* | (2015.01) |
| *B29C 64/153* | (2017.01) |
| *B33Y 40/00* | (2020.01) |
| *B29C 64/205* | (2017.01) |

(52) U.S. Cl.
CPC .......... *B29C 64/214* (2017.08); *B22F 3/1055* (2013.01); *B28B 1/001* (2013.01); *B29C 64/153* (2017.08); *B29C 64/205* (2017.08); *B33Y 30/00* (2014.12); *B33Y 40/00* (2014.12); *B22F 2003/1056* (2013.01)

(58) Field of Classification Search
CPC ... B29C 64/10; B29C 64/141; B29C 64/1533; B29C 64/214; B29C 64/205; B29C 64/223; B33Y 10/00; B33Y 30/00; B33Y 40/00
See application file for complete search history.

(56) References Cited

U.S. PATENT DOCUMENTS

| | | | |
|---|---|---|---|
| 8,070,474 B2 | 12/2011 | Abe et al. | |
| 8,083,513 B2 | 12/2011 | Montero-Escuder et al. | |
| 8,308,466 B2 | 11/2012 | Ackelid et al. | |
| 8,568,124 B2 * | 10/2013 | Brunermer | B29C 64/165 425/375 |
| 8,994,592 B2 | 3/2015 | Scott et al. | |
| 9,346,127 B2 | 5/2016 | Buller et al. | |
| 9,649,815 B2 | 5/2017 | Atwood et al. | |
| 2012/0266815 A1 | 10/2012 | Brunermer | |
| 2013/0241113 A1 | 9/2013 | Geers et al. | |

(Continued)

FOREIGN PATENT DOCUMENTS

WO 2017009368 A1 1/2017

OTHER PUBLICATIONS

Renap et al., "Recoating issues in stereolithography", Rapid Prototyping Journal, vol. 1, Issue: 3, pp. 4-16, 1995, Nottingham, UK.

*Primary Examiner* — Joseph S Del Sole
*Assistant Examiner* — Thu Khanh T Nguyen
(74) *Attorney, Agent, or Firm* — Armstrong Teasdale LLP (57) ABSTRACT

A powder spreader is presented. The powder spreader includes a base element having at least a first side and a spreading element including a sheet having a curved portion protruding from the at least first side of the base element, where the curved portion of the sheet is substantially free of a discontinuity. An additive manufacturing apparatus including the powder spreader is also presented.

20 Claims, 4 Drawing Sheets

(56) References Cited

U.S. PATENT DOCUMENTS

2014/0314609 A1* 10/2014 Ljungblad ............. B29C 64/153
  419/1
2016/0257051 A1* 9/2016 Pappas ................. B29C 48/865
2017/0157841 A1 6/2017 Green

* cited by examiner

POWDER SPREADER AND ADDITIVE MANUFACTURING APPARATUS THEREOF

BACKGROUND

The present disclosure relates generally to a powder spreader, and specifically to a powder spreader for use in an additive manufacturing apparatus.

An additive manufacturing process may involve manufacturing three-dimensional (3D) objects through fusion of powder materials in two-dimensional (2D) layers on a layer-by-layer basis. Generally, layers of powder materials are successively laid down and irradiated with an energy source so that particles of the powder materials within each layer are sequentially fused to form a solidified cross-section of the desired 3D object. While some available additive manufacturing technologies directly deposit the powder material, others use a spreading or recoating process to form consecutive layers that can then be selectively fused in order to create the solidified cross-section of the desired 3D object. Each time the powder material is deposited, a recoater or a powder spreader may be used to form a layer of the powder material.

A variety of recoaters may include blades, knifes and rollers. However, there is often a contradiction between compliance to increase process robustness and reduction in contamination due to the material of the recoater. For example, in a direct metal laser melting (DMLM) process, a rigid blade made of the same material as the material being processed is typically used in order to minimize contamination. The rigid blade may be detrimental as it may damage the powder material being processed and cause part warping. Also, the currently available powder spreaders may lack material compatibility and may not be mechanically compliant.

BRIEF DESCRIPTION

In one aspect, an improved powder spreader for use in an additive manufacturing apparatus is provided. The powder spreader includes a base element having at least a first side and a spreading element including a sheet having a curved portion protruding from the at least first side of the base element, where the curved portion of the sheet is substantially free of a discontinuity.

In another aspect, an additive manufacturing apparatus is provided. The additive manufacturing apparatus includes a build platform disposed in a chamber and a powder spreader movable above a surface of the build platform. The powder spreader includes a base element having at least a first side facing the build platform and a spreading element including a sheet having a curved portion protruding from the at least first side of the base element. The curved portion of the sheet is substantially free of a discontinuity.

In yet another aspect, an additive manufacturing apparatus is provided. The an additive manufacturing apparatus includes a build platform configured to receive a powder material on a surface the build platform, a powder delivery system configured to dispose the powder material on the surface of the build platform, a powder spreader movable above the surface of the build platform and configured to distribute the powder material disposed on the surface of the build platform, and a focused energy source configured to irradiate the powder material disposed on the surface of the build platform. The powder spreader includes a base element having at least a first side facing the build platform and a spreading element including a sheet having a curved portion protruding from the at least first side of the base element. The curved portion of the sheet is substantially free of a discontinuity. The sheet and the powder material include substantially same material composition.

These and other features, embodiments, and advantages of the present disclosure may be understood more readily by reference to the following detailed description.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

The present disclosure generally encompasses powder spreaders for use in an additive manufacturing apparatus. The powder spreaders, as described herein, advantageously overcome the above noted shortcomings of the presently available powder spreaders and provide both mechanical compliance and material compatibility while distributing a powder material on a build platform to form a layer. In particular, the powder spreader allows process flexibility while maintaining low material contamination risk and long life. The powder spreader may be referred to as a recoater, and these terms may be used interchangeably throughout the description.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", is not limited to the precise value specified. In some instances, the approximating language may correspond to the precision of an instrument for measuring the value.

The present disclosure is described with respect to particular embodiments and certain drawings, but the disclosure is not limited thereto and is only limited by the claims. The drawings described are only schematic and are non-limiting. In the drawings, the size of some of the elements or components may be exaggerated and not drawn to scale for illustrative purposes. The dimensions and relative dimensions do not correspond to actual dimensions to practice the disclosed apparatus.

The term, "additive manufacturing," as used herein, refers to processes for manufacturing objects using additive manufacturing processes. The additive manufacturing processes, typically, form net shaped structures or near-net shaped structures through sequentially and repeatedly depositing and joining material layers in which material particles are bonded together. In some embodiments, the material layers are fused (for example, sintered or melted) together using a focused energy such as a laser beam. As used herein "near-net shape" means that an object formed has a shape very close to the final shape of the object and does not require significant traditional mechanical finishing techniques such as machining or grinding following the additive manufacturing process. As used herein "net shape" means that an object formed has the final shape of the object and does not require any traditional mechanical finishing techniques such as machining or grinding following the additive manufacturing process.

Additive manufacturing apparatus and processes include, for example, and without limitation, vat photopolymerization, powder bed fusion, binder jetting, material jetting, sheet lamination, material extrusion, directed energy deposition and hybrid systems. These apparatus and processes may include, for example, and without limitation, stereolithography, digital light processing, scan, spin, and selectively photocure, continuous liquid interface production, selective laser sintering, direct metal laser sintering, selective laser melting, electron beam melting, selective heat sintering, multi-jet fusion, smooth curvatures printing, multi jet modeling, laminated object manufacture, selective deposition lamination, ultrasonic additive manufacturing, fused filament fabrication, fused deposition modeling, laser metal deposition, laser engineered net shaping, direct metal deposition, hybrid systems, and combinations of these methods and systems. These processes and corresponding apparatus may employ, for example, and without limitation, all forms of electromagnetic radiation, heating, sintering, melting, curing, binding, consolidating, pressing, embedding, or combinations thereof.

Some embodiments of the present disclosure relate to laser sintering/melting apparatus and process where layers of a powder material are laid down and irradiated with a laser beam so that the particles of the powder material within each layer are sequentially sintered or melted to form a solidified layer. Suitable examples of laser sintering/melting apparatus and processes include, without limitation, Direct Metal Laser Melting, Direct Metal Laser Sintering, Direct Metal Laser Deposition, Laser Engineered Net Shaping, Selective Laser Sintering, Selective Laser Melting, or Electron Beam Melting.

Figure 1:
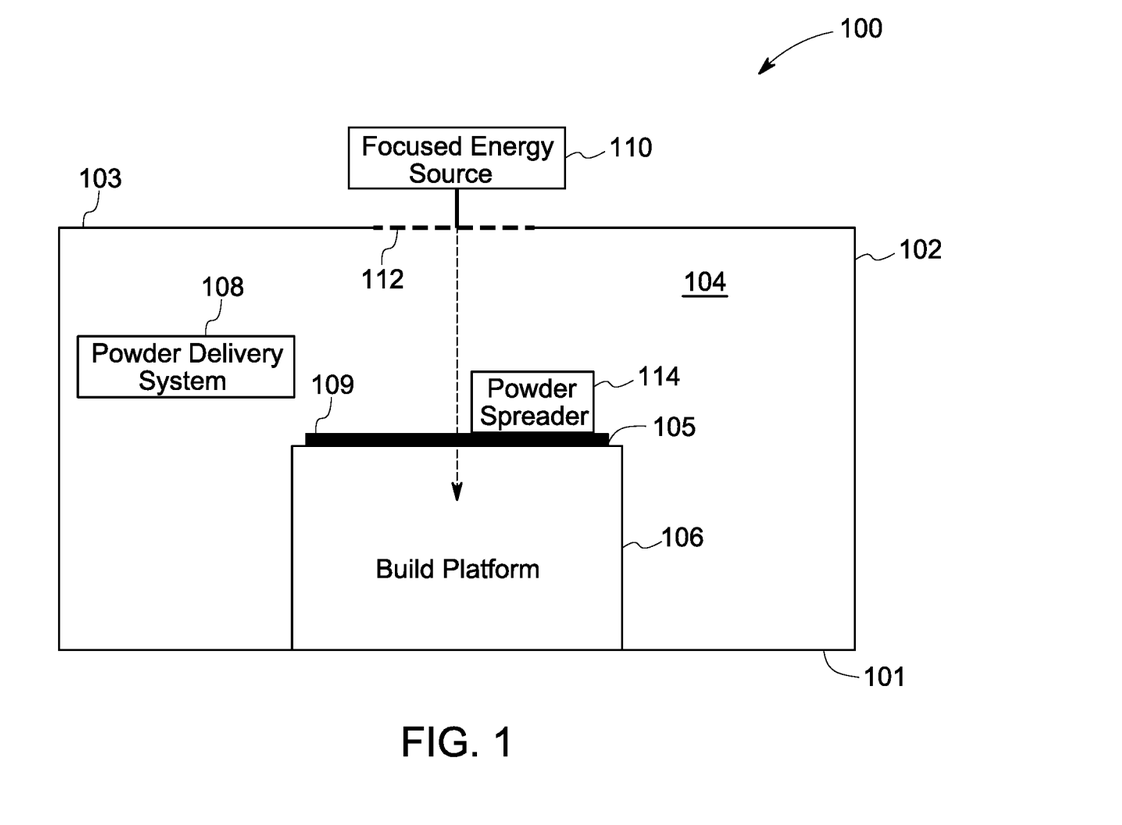
FIG. 1 is a schematic representation of an additive manufacturing apparatus, in accordance with some embodiments of the present disclosure.

FIG. 1 schematically shows an additive manufacturing apparatus 100, in some embodiments. The apparatus 100 includes a housing 102 defining a chamber 104 having a volume. The chamber 104 may be sealable against the ambient atmosphere. In one embodiment, the chamber 104 includes an inert atmosphere including a gas selected from the group consisting of nitrogen, argon, helium, and mixtures thereof. The apparatus 100 includes a build platform 106 disposed on a base portion 101 of the housing 102 inside the chamber 104, on which a desired object is fabricated. The apparatus 100 further includes a powder delivery system 108 that is arranged to dispose a powder material on a surface 105 of the build platform 106. The build platform 106 is arranged to receive the powder material on the surface 105. The powder delivery system 108 may include a powder reservoir that contains the powder material and a supply means to supply and dispose a quantity of the powder material on the surface 105. The disposed powder material on the surface 105 may form a powder bed 109. In the apparatus 100, the build platform 106 may be movable in a vertical direction so that, with increasing construction height of the object while fabricating the object layer-by-layer, the build platform 106 can be moved downwards in the vertical direction.

The apparatus 100 includes a focused energy source 110 for generating and directing a focused energy onto at least a portion of the surface 105 of the build platform 106. The focused energy source 110 is configured to irradiate the powder bed 109 or the powder material disposed on the surface 105. As illustrated in FIG. 1, the focused energy source 110 is arranged proximate a top portion 103 of the housing 102, opposite to the base portion 101. The focused energy may enter the chamber 104 through a window 112 in the housing 102. The powder bed 109 disposed on the build platform 106 may be subjected to the focused energy in a selective manner as controlled by a controller (not shown in figures) such as computing unit depending on the desired geometry of the object.

In some embodiments, the focused energy source 110 includes a laser source for generating a laser beam. In embodiments where the focused energy includes a laser beam, the window 112 may be referred to as a laser window. In some embodiments, the laser source includes a pulsed laser source that generates a pulsed laser beam. The pulsed laser beam does not emit laser radiation continuously in contrast with a continuous laser radiation, but emits the laser in a pulsed manner i.e., in time limited pulses with intervals between the laser pulses. In some embodiments, a plurality of focused energy sources is configured to selectively irradiate focused energies (e.g., laser beams) onto the powder bed 109 or the disposed powder material on the surface 105.

The apparatus 100 further includes a powder spreader 114 arranged above the build platform 106. The powder spreader 114 is movable above the surface 105 and configured to distribute the powder material disposed on the surface 105 to form a layer of the powder material. In some embodiments, the powder spreader 114 distributes the powder material on the surface 105 of the build platform 106 such that the resulting layer defines a substantially planar surface. In some embodiments, the powder spreader 114 is movable above the build platform 106 in a plane parallel to the surface 105 of the build platform 106. Furthermore, in some embodiments, the powder delivery system 108 and the powder spreader 114 may be integrated and a single system may be used for supplying, disposing, and subsequently distributing the powder material to form the layer.

While manufacturing an object using the additive manufacturing apparatus 100, after a layer of the powder material has been processed as a result of being irradiated by a focused energy directed by the focused energy source 110, at least a portion of the build platform 106 may be moved, for example, lowered within the chamber 104. Thereafter, additional powder material may be delivered to deposit another layer of the powder material onto the previous layer and/or the powder bed 109 disposed on the surface 105.

Each time a quantity of the powder material is disposed on the surface 105, the powder spreader 200 may be used to distribute a layer of the disposed powder material. In some embodiments, the layer is deposited such that the layer defines a substantially planar surface. The disposed layer of the powder material can then be irradiated using the focused energy directed by the focused energy source 110 to fuse the powder material and form a solidified layer.

The operation of various components of the additive manufacturing apparatus 100 such as irradiation of the layer of the powder material or the powder bed 109 by the focused energy source 110, delivery of the powder material by the powder delivery system 108, operation of the powder spreader 200, maintenance of the desired temperature, and pressure inside the chamber 104 may be controlled by a controller such as a computing unit.

The powder material (to be processed to form an object) may include, but is not limited to, a polymer, plastic, metal, ceramic, sand, glass, wax, fiber, biological matter, a composite, or combinations thereof. In some embodiments, the powder material can be a metallic material, non-limiting examples of which include aluminum and its alloys, titanium and its alloys, nickel and its alloys, stainless steels, cobalt-chrome alloys, tantalum, and niobium. These powder materials may have particles of a variety of forms, shapes, and sizes as appropriate for a given material and process. The powder material may include, for example without limitation, particles, filaments, atomized particles, and combinations thereof. The particles of the powder material may have a particle size less than 100 microns. In some embodiments, an average particle size of the powder material is less than 50 microns. In some embodiments, the particle size of the particles of the powder material is in a range from about 10 microns to about 100 microns. In certain embodiments, the particle size of the particles of the powder material is in a range from about 15 microns to about 50 microns.

Figure 2:
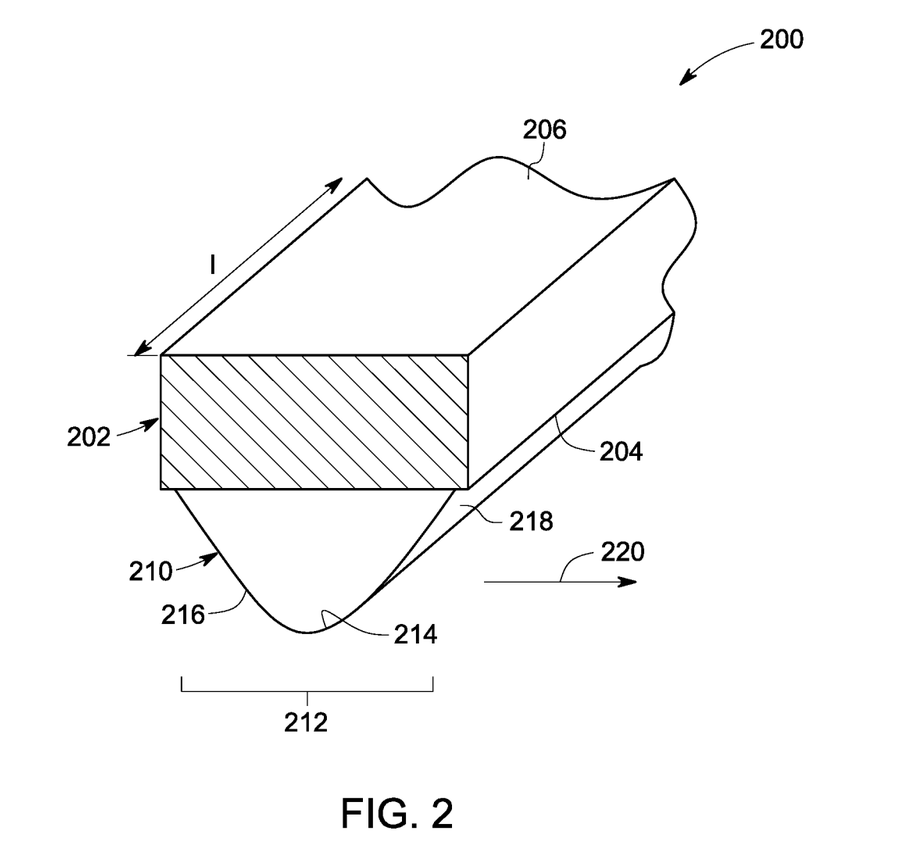
FIG. 2 is a schematic perspective view of a powder spreader, in accordance with some embodiments of the present disclosure.

FIG. 2 shows a schematic perspective view 200 of the powder spreader 114 of FIG. 1, in some embodiments. Also, FIG. 2 is described with reference to the components of FIG. 1.

The powder spreader 200 includes a base element 202 having a first side 204 and a second side 206 opposing the first side 204. The powder spreader 200 includes a spreading element 210. The spreading element 210 includes a sheet 218 having a curved portion 212 protruding from the first side 204 of the base element 202. The powder spreader 200 may have a length 'l' that may be equal to or greater than at least one dimension of the build platform 106 of FIG. 1. In some embodiments, the spreading element 210 extends along the length 'l'. This may allow the powder spreader 200 to distribute the disposed powder material on the entire surface 105 of the build platform 106 by moving the powder spreader 200 in a direction perpendicular to the corresponding dimension of the build platform 106. In some embodiments, the powder spreader 200 is movable in a direction 220 that is perpendicular to the length 'l' of the powder spreader 200.

As previously noted, the powder spreader 200 is configured to move above the build platform 106 in a plane parallel to the build platform 106. The powder spreader 200 can distribute the powder material to form a layer on any portion of the surface 105 of the build platform 106.

Moreover, the base element 202 may be a frame, a rod, a disc, a box, or a plate having any suitable cross-section such as polygon, circular, elliptical etc. The base element 202 has a length 'l'. In some embodiments, the base element 202 may have a cross section of a polygon, for example a square or a rectangle. The base element 202 may act as a support to the spreading element 210. The base element 202 may also include one or more devices to operate and control the powder spreader 200 and some additional features/parameters including detection of the surface properties of the powder bed 109 and the deposited layer of the powder material.

As illustrated in FIG. 2, the spreading element 210 includes the sheet 218 having the curved portion 212 protruding from the first side 204 of the base element 202. A vertical distance by which the curved portion 212 protrudes from the first side 204 can be measured as a height of the curved portion 212 from a surface of the first side 204 of the base element 202. This vertical distance may depend, in part, on a desired radius of curvature and the mechanical performance of the curved portion 212. The curved portion 212 may protrude from the first side 204 by a vertical distance less than 10 millimeters. In some embodiments, the curved portion 212 protrudes from the first side 204 by a vertical distance in a range from about 0.5 millimeters to about 5 millimeters.

In some embodiments, the curved portion 212 has a concave surface 214 facing the base element 202 and a convex surface 216 facing away to the base element 202. The convex surface 216 of the spreading element 210 may be in contact with the powder bed 109 or the disposed powder material on the surface 105 of the build platform 106 in the additive manufacturing apparatus 100 (as illustrated in FIG. 1 and FIG. 3).

Figure 3:
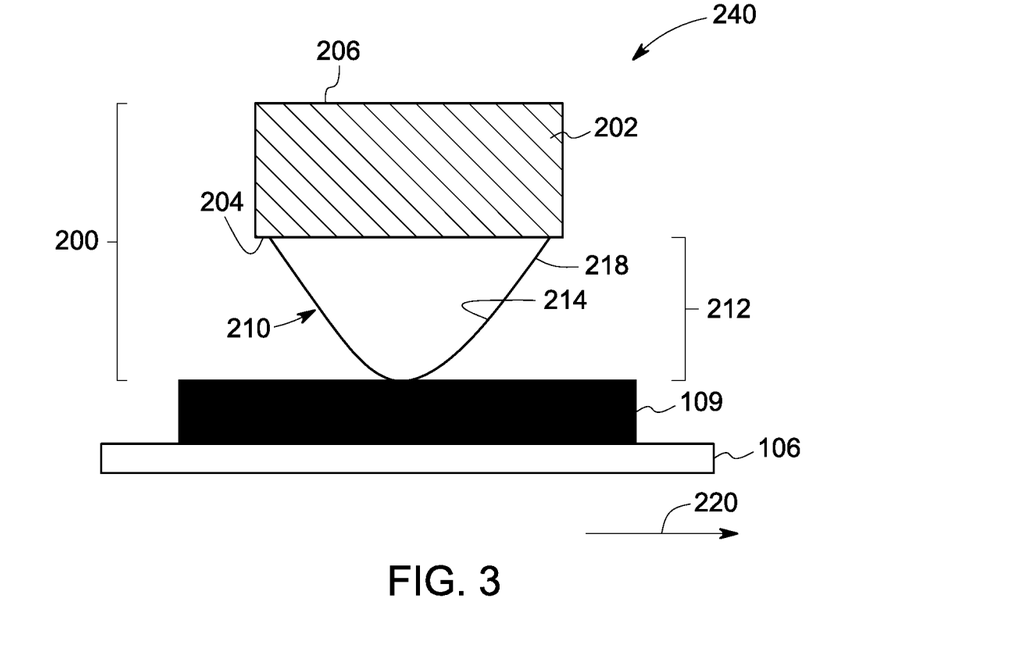
FIG. 3 show a schematic of a portion of the additive manufacturing apparatus of FIG. 1, in accordance with some embodiments of the present disclosure.

As used herein, the term "sheet" may be a foil or a shim that is flexible enough to bend and form a curved portion for example, the curved portion 212 in FIGS. 2 and 3. In some embodiments, the curved portion 212 of the sheet 218 is mechanically compliant. The term "mechanically compliant", as used herein, means that the curved portion 212 of the sheet 218 has the flexibility to deform in a predictable manner to allow deformations in the object being built as well as the strength (in particular, stiffness) to push and distribute a powder material disposed on a surface to form a layer of the powder material on the surface without undue force being applied on the object being built. The flexibility and strength of the curved portion 212 may, in part, depend on the material used to form the sheet 218 and the thickness of the sheet 218. By tailoring the selection of the material and thickness, a sheet of desirable flexibility and strength may be formed. Suitable materials for forming the sheet 218 may include, but are not limited to, a polymer, plastic, metal, ceramic, sand, glass, wax, fiber, biological matter, a composite, or combinations thereof.

FIG. 3 illustrates a portion 240 of the additive manufacturing apparatus 100 of FIG. 1. In particular, FIG. 3 depicts a front view of the powder spreader 200 of FIG. 2 disposed above the build platform 106 of FIG. 1. Also, FIG. 3 is described with reference to the components of FIGS. 1-2.

As illustrated in FIG. 3, the powder spreader 200 is placed above the build platform 106 such that the first side 204 of the power spreader 200 faces towards the build platform 106. In one embodiment, the curved portion 212 of the spreading element 210 is adjacent to the surface 105 and the base element 202 is away from the surface 105. As illustrated, the powder spreader 200 is movable above the surface 105 of the build platform 106 in the direction 220 that is perpendicular to the length 'l' of the powder spreader 200.

The distance between the powder spreader 200 and the build platform 106 may be adjusted by moving the build platform 106 in a downward direction, i.e., away from the powder spreader 200. In some embodiments, the curved portion 212 is tangential to the surface 105 while spreading a first layer of the powder material on the surface 105. However, in some other embodiments, the curved portion 212 may be tangential to the powder bed 109 while spreading subsequent layers of the powder material on the previously laid layers of the powder material. In some embodiments, the distance of the curved portion 212 from the powder bed 109 or the surface 105 may be approximately equal to a desired thickness of a layer of the powder material to be formed on the powder bed 109 or the surface 105. The thickness of a layer of the powder material may be as small as a size of a particle of the powder material. In one example, the thickness of the layer of the powder material may be in a range from about 10 microns to about 150 microns. In other embodiments, the thickness of the layer of the powder material may be in a range from about 20 microns to about 100 microns.

Figure 4:
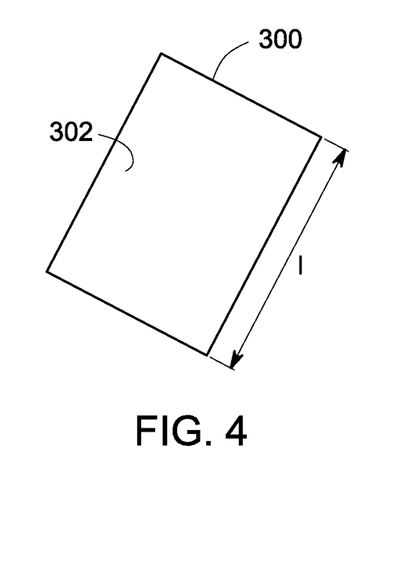
FIG. 4 depicts a sheet in a flat form, in accordance with some embodiments of the present disclosure.

FIG. 4 depicts one embodiment 300 of the sheet 218 of FIG. 3. In particular, in FIG. 3, the sheet 300 is in a flat form. It may be noted that the sheet 300 is in the flat form prior to being coupled to the base element 202 of FIG. 2. Also, FIG. 4 is described with reference to the components of FIGS. 1-3.

The sheet 300 may have a length 'l'. In some embodiments, the sheet 300 has a thickness in a range from about 100 microns to about 1 millimeter. In other embodiments, the thickness of the sheet 300 is in a range from about 100 microns to about 800 microns. In certain embodiments, the thickness of the sheet 300 is in a range from about 200 microns to about 500 microns. In some embodiments, the sheet 300 may have a surface 302 that is substantially planar. In these embodiments, the surface 302 of the sheet 300 eventually forms the convex surface 216 of the curved portion 212 and would be in contact with the powder material disposed on the surface 105 or the powder bed 109. Further, in some embodiments, a portion of the sheet 300 that eventually forms the curved portion 212 of the spreading element 210 (see FIG. 2), is substantially free of a discontinuity. In some embodiments, the entire sheet 300 is substantially free of a discontinuity. As used herein, the term "discontinuity" refers to an interruption in a surface. The discontinuity may include an opening such as a cut, a hole; a surface irregularity, or a combination thereof. The term "substantially free of," as used herein in reference to possible surfaces refers to a surface that includes a discontinuity less than the average particle size of the powder material.

The sheet 300 may be formed of any material that does not cause adverse metallurgical effects on the object being built as these materials may be incorporated into the powder material during the processing of the powder material. The materials of the sheet 300 and the powder material may be different to the extent that the material of the sheet 300 does not degrade the material performance of the object being built. In some embodiments, the sheet 300 includes a material having substantially same material composition that is used for the powder material to be processed. That is, the sheet 300 and the powder material include substantially the same material composition. This may help in avoiding contamination of the powder material when the curved portion 212 distributes the powder material on the surface 105 of the build platform 106. In some embodiments, the material compositions of the sheet 300 and the powder material include the same material composition. For example, in certain embodiments, the powder material includes a metallic material and the sheet 300 is formed of the same metallic material. Other possible materials may be materials that ablate or vaporize upon interaction with electromagnetic radiation.

In some other embodiments, the sheet 300 may be formed of a material different from the material of the powder material being processed. In these embodiments, the sheet 300 includes a coating disposed on the surface 302 of the sheet 300. The coating is disposed on the surface 302 of the sheet 300, which eventually forms the convex surface 216 of the curved portion 212 and would be in contact with the powder material disposed on the surface 105 or the powder bed 109. The coating may include a wear resistant material. In some of these embodiments, the coating includes a material composition substantially same as the material composition of the powder material to be processed. Use of such a coating on the convex surface 216 that may be in contact with the powder material disposed on the surface 105 or the powder bed 109 may be helpful in avoiding contamination of the powder material being processed. In some embodiments, the coating includes a material composition same as the material composition of the powder material being processed. Other possible materials for the coating may be materials that ablate or vaporize upon interaction with the electromagnetic radiation.

As used herein, the term "substantially same material composition" means that the material compositions of the sheet 300 or the coating and the powder material may have same material properties to the extent that the sheet 300 or the coating does not degrade the material performance of the object being built. In some embodiments, the material compositions of the sheet 300 or the coating and the powder material include substantially same constituents in substantially same amounts. As used herein, "substantially same constituents in substantially same amounts" means that the material compositions of the sheet 300 or the coating and the powder material may include same constituents that are present more than 10 weight percent of a total amount of the material composition. In some embodiments, the amounts of these constituents may vary by 10 weight percent. In other embodiments, the material compositions of the sheet 300 or the coating and the powder material may include different additional constituents that are present in less than 10 weight percent.

In order to form the spreading element 210 of the powder spreader 200 (FIG. 2), the sheet 300 of FIG. 3 may be partially coupled to the base element 202 to form the curved portion 212 that protrudes from the first side 204. As used herein, the term "coupled" means that the two parts or components are mechanically attached or the two parts are portions of a single piece of a component. "Partially coupled" means that at least a portion of a part or component is coupled to at least a portion of another part or component.

In some embodiments, at least a portion of the sheet 300 may be coupled to the base element 202 to form the curved portion 212. For example, the edges along the length 'l' of the sheet 300 may be attached to the base element 202. The curved portion 212 may be formed by the sheet's own elasticity or by disposing a compliant material on a surface (opposing to the surface 311) of the sheet 300 to form the concave surface 214 of the curved portion 212. In some other embodiments, the sheet 300 can be bent in a desired shape and then coupled to the base element 202 to form the curved portion 212.

Figure 5:
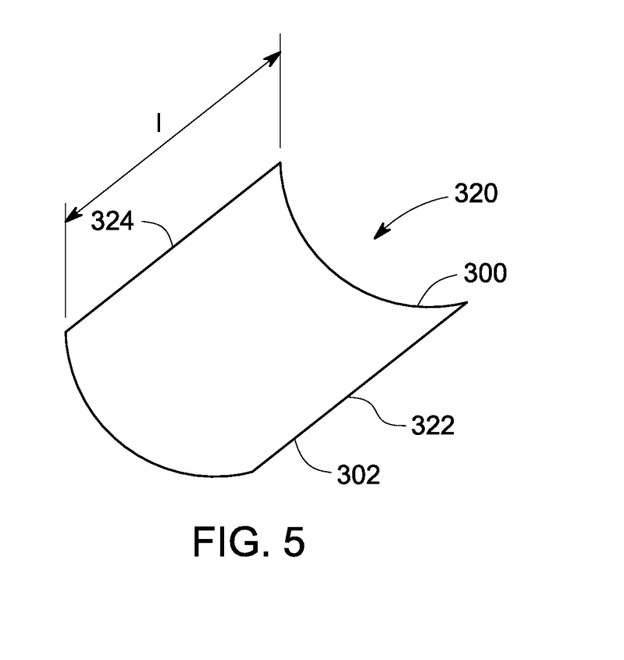
FIG. 5 depicts the sheet of FIG. 4 in a bent form; in accordance with some embodiments of the present disclosure.
Figure 6:
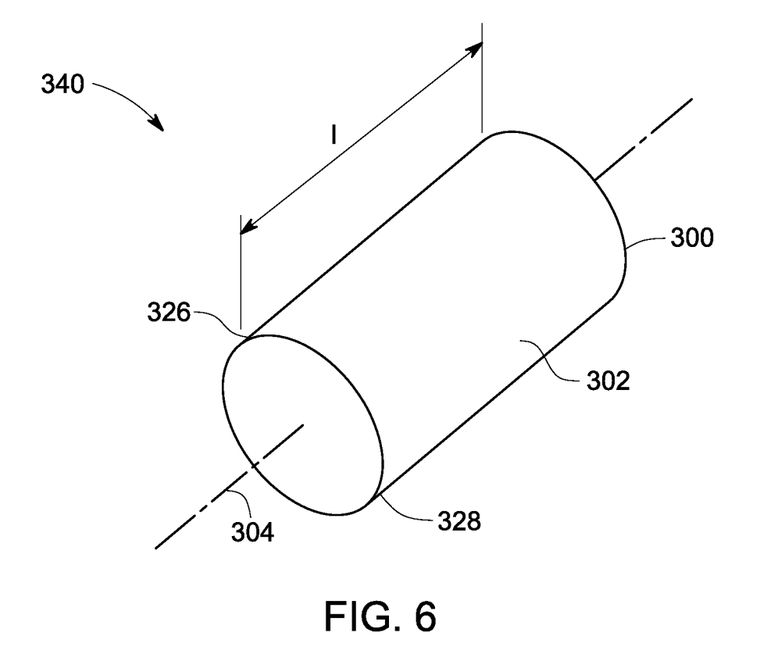
FIG. 6 depicts the sheet of FIG. 4 in a bent form; in accordance with some other embodiments of the present disclosure.

FIG. 5 and FIG. 6 depict the sheet 300 of FIG. 4 in bent forms. The sheet 300 in the bent forms may have a desirable radius of curvature to form the curved portion 212 (FIG. 2)

after being partially coupled to the base element 202. FIGS. 5-6 are described with reference to the components of FIGS. 1-4.

In particular, FIG. 5 depicts one embodiment 320 of the sheet 300 in a bent form for use as a curved portion of the powder spreader 114 of FIG. 1. In the embodiment 320 illustrated in FIG. 5, edges 322, 324 of the sheet 300 along the length 'l' may be mechanically attached to two parallel portions of the base element 202 to form the curved portion 212.

Referring now to FIG. 6, another embodiment 340 of the sheet 300 in a bent form is presented. In particular, the sheet 300 is bent in a shape of a cylinder or a tube about an axis 304 along the length of the sheet 300. Portions 326, 328 of the cylindrical form of the sheet 300, which extend along the length of the sheet 300 may be coupled to the base element 202 to form the curved portion 212 of the powder spreader 200.

As previously noted, the curved portion 212 of the sheet 218 is substantially free of a discontinuity (see FIG. 2). As used herein, the term "discontinuity" refers to an interruption in a surface. The discontinuity may include an opening such as a cut, a hole; a surface irregularity, or a combination thereof. A discontinuity for example, an opening may trap the fine powder material having particle size less than 100 microns and cause irregularities in a powder bed or a layer of the powder material being laid. In some embodiments, the curved portion 212 is free of an opening. In some embodiments, the convex surface 216 of the curved portion 212 is substantially free of a surface irregularity. Surface irregularities may include small scale irregularities (less than 10 millimeters in size) such as surface roughness and large-scale irregularities (greater than 10 millimeters in size) such as surface waviness along a dimension of the sheet 218 perpendicular to a direction of movement of the curved portion 212. Small-scale irregularities if present on the convex surface 216 may cause defects in the object being built due to uneven thickness of the layer of the powder material caused by the small-scale irregularities. Large-scale irregularities if present on the convex surface may cause distortion in the object being built. The term "substantially free of," as used herein in reference to possible surfaces refers to a surface that includes a discontinuity less than the average particle size of the powder material.

Conventionally, recoaters are often limited to rigid blades as these recoaters are required to be made of the same material that is being processed in order to minimize contamination. The rigid blades may limit process capability since these blades physically interfere with the powder material being processed resulting in build failure, part warping, and limited selection of process parameters. Embodiments of the present disclosure advantageously provide a powder spreader having a spreading element that includes a curved sheet. The curved sheet as a spreading element, as described herein, provides mechanical compliance as well as reduces/removes risk of the contamination of the powder material being processed. In contrast to conventional rigid recoater blades, the curved sheet of the powder spreader, as described herein, provides mechanical flexibility to deform in a predictable manner that allows part deformations (in the object being built) and avoids part warping and any flick or catch of the powder material due to the curved shape of the spreading element. In addition, use of a sheet in the powder spreader allows a variety of suitable materials to form the sheet when a desired material may not be capable of being formed into a sheet. The sheet can be coated with a wear resistant coating that helps in avoiding contamination and wear of the powder material with the material used to form the sheet.

Referring again to FIG. 2, in some embodiments, the powder spreader 200 as shown in FIG. 2 may also include one or more devices to damp undesirable vibrations, alter stiffness of the curved portion 212, induce desirable vibrations, or combinations thereof. In some embodiments, the powder spreader 200 includes a vibration damper (not shown). A vibration damper may help in reducing undesirable vibrations, resonance, and noise in the powder spreader. In some embodiments, the powder spreader includes a transducer (not shown). The transducer may help in producing desirable vibrations in order to uniformly distribute the powder material. The stiffness of the curved portion 212 may be altered depending on various parameters such as amount of powder material to be spread, desired thickness of a layer of the powder material, and the like. The stiffness of the curved portion 212 may be controlled by spring forces, gas pressure, filling of a compliant material on the concave surface 214 of the curved portion 212, or combinations thereof.

Further, in some embodiments, the powder spreader 200 includes one or more sensors. The one or more sensors may help in detecting various surface properties of the powder bed and/or applied force on the powder bed during and/or after spreading the powder material. A piezoelectric element can be used for detecting surface deformation of the disposed powder bed and/or subsequent powder layer. An electromagnetic sensor may be used for detecting density of the disposed powder bed and/or subsequent powder layer. A load cell may be used for detecting applied force on the powder bed by the powder spreader during and/or after spreading the powder material.

As illustrated in FIG. 2, the spreading element 210 includes the curved portion 212 that has a single projection. As used herein, the term "projection" refers to a protuberance on a sheet that is formed by bending or folding the sheet. In some embodiments, a projection extends along a dimension of the sheet 218 that is perpendicular to the movement of the curved portion 212 of the sheet 218.

Figure 7:
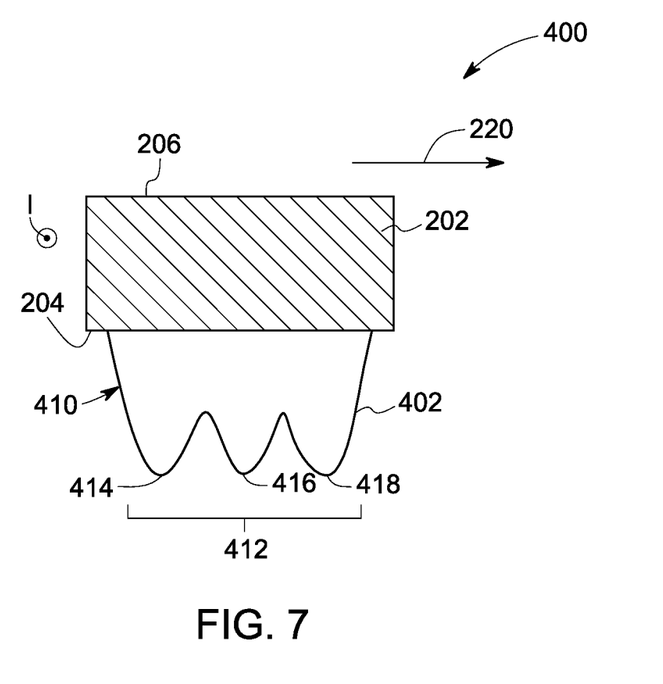
FIG. 7 is a schematic perspective view of a powder spreader, in accordance with some other embodiments of the present disclosure.

In some embodiments, a flat sheet 300 (FIG. 3) may be bent in a variety of profiles to have more than one projections to form a curved portion as shown in FIG. 7. FIG. 7 illustrates a powder spreader 400 that includes a spreading element 410 including a sheet 402 having a curved portion 412. The curved portion 412 includes more than one projections, for example a first projection 414, a second projection 416 and a third projection 418. Such profiles may help in distributing the powder material on a surface depending on the flow characteristics of the powder material.

While only certain features of the disclosure have been illustrated and described herein, many modifications and changes will occur to those skilled in the art. It is, therefore, to be understood that the appended claims are intended to cover all such modifications and changes as fall within the scope of the disclosure.

The invention claimed is:

1. A powder spreader comprising:
  a base element having at least one side; and
  a spreading element comprising a sheet having a first edge, a second edge opposite the first edge, and a curved portion protruding from the at least one side of the base element, wherein the first edge and the second edge are attached to the at least one side of the base element to form the curved portion, and wherein the curved portion of the sheet is substantially free of a discontinuity and comprises a plurality of projections.

2. The powder spreader of claim 1, wherein the base element is in a form of a rod, a plate, a frame, a box, or combinations thereof.

3. The powder spreader of claim 1, wherein the sheet has a thickness in a range from about 100 microns to about 1 millimeter.

4. The powder spreader of claim 1, wherein the sheet comprises a polymer, plastic, metal, ceramic, sand, glass, wax, fiber, biological matter, a composite, or combinations thereof.

5. The powder spreader of claim 1, wherein the curved portion protrudes from the at least one side of the base element by a vertical distance less than 10 millimeters.

6. The powder spreader of claim 1, wherein the curved portion protrudes from the at least one side of the base element by a vertical distance in a range from about 0.5 millimeter to about 5 millimeters.

7. The powder spreader of claim 1, wherein the curved portion of the spreading element comprises a coating disposed on a portion of a convex surface of the curved portion.

8. An additive manufacturing apparatus, comprising:
a build platform disposed in a chamber;
a powder spreader movable above a surface of the build platform, the powder spreader comprising:
a base element having at least one side facing the build platform; and
a spreading element comprising a sheet having a first edge, a second edge opposite the first edge, and a curved portion protruding from the at least one side of the base element, wherein the first edge and the second edge are attached to the at least one side of the base element to form the curved portion, and wherein the curved portion of the sheet is substantially free of a discontinuity and comprises a plurality of projections.

9. The additive manufacturing apparatus of claim 8, wherein the sheet has a thickness in a range from about 100 microns to about 1 millimeter.

10. The additive manufacturing apparatus of claim 8, wherein the sheet comprises a polymer, plastic, metal, ceramic, sand, glass, wax, fiber, biological matter, a composite, or combinations thereof.

11. The additive manufacturing apparatus of claim 8, wherein a powder material is disposed on the surface of the build platform.

12. The additive manufacturing apparatus of claim 11, wherein the powder spreader is movable above the powder material disposed on the surface of the build platform.

13. The additive manufacturing apparatus of claim 11, wherein the powder material comprises a polymer, plastic, metal, ceramic, sand, glass, wax, fiber, biological matter, a composite, or combinations thereof.

14. The additive manufacturing apparatus of claim 11, wherein the powder material comprises particles of an average particle size less than 50 microns.

15. The additive manufacturing apparatus of claim 11, wherein the sheet and the powder material comprise substantially same material composition.

16. The additive manufacturing apparatus of claim 8, wherein the curved portion protrudes from the at least one side by a vertical distance less than 10 millimeters.

17. The additive manufacturing apparatus of claim 8, wherein a distance between the curved portion and the surface of the build platform is in a range from about 10 microns to about 100 microns.

18. The additive manufacturing apparatus of claim 8, wherein the curved portion of the sheet is free of an opening.

19. An additive manufacturing apparatus, comprising:
a build platform configured to receive a powder material on a surface of the build platform;
a powder delivery system configured to dispose the powder material on the surface of the build platform;
a powder spreader movable above the surface of the build platform and configured to distribute the powder material disposed on the surface of the build platform, the powder spreader comprising:
a base element having at least one side facing the build platform;
a spreading element comprising a sheet partially coupled to the base element to form a curved portion that protrudes from the at least one side of the base element, wherein the curved portion of the sheet is substantially free of a discontinuity and comprises a plurality of projections, and wherein the sheet and the powder material comprise substantially same material composition; and
at least one sensor configured to detect a surface property of the powder material disposed on the surface of the build platform; and
a focused energy source configured to irradiate the powder material disposed on the surface of the build platform.

20. The powder spreader of claim 1, wherein the plurality of projections comprises a plurality of peaks arranged in series in a direction of travel of the powder spreader.

* * * * *